United States Patent Office 3,074,969
Patented Jan. 22, 1963

3,074,969
METHOD OF PREPARING MALEIC ANHYDRIDE
Ralph O. Kerr, Houston, Tex., and Wayne R. Decker, Moundsville, and Charles M. Dorsett, New Martinsville, W. Va., assignors, by mesne assignments, to Pittsburgh Plate Glass Company
No Drawing. Filed May 12, 1959, Ser. No. 812,577
5 Claims. (Cl. 260—346.8)

The present invention relates to the production of dicarboxylic acids and anhydrides. More particularly, the present invention relates to the production of maleic anhydride and to the catalysts suitable for use in producing maleic anhydride.

It is known to produce maleic anhydride by catalytic vapor phase oxidation. For example, one method commonly employed is the reaction of benzene and oxygen in the presence of a catalyst at elevated temperature. This reaction may be illustrated by the following formula:

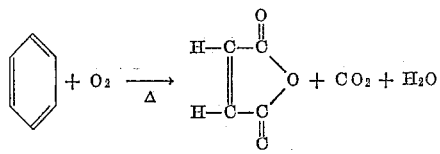

While processes typified by the above equation are well known, many problems are encountered in their performance. Thus, catalysts sometimes behave erratically from batch to batch, often resulting in unduly low yields and seriously interfering with the predictability of yields. Short catalyst life is also frequently encountered. Operation with high oxygen to organic ratios and/or unduly long contact times are frequently required to sustain the activity of the catalyst at the expense of potential product. These and other similar problems seriously interfere with the overall economy of the process.

It has been found according to the present invention that many problems encountered in vapor phase oxidation process for the production of maleic anhydride may now be eliminated entirely or minimized to a significant extent. A catalyst having long life is also provided. The catalyst, according to the method of its preparation, is reproducible and uniform yields of product are achieved. Low oxygen to organic feed ratios may be employed thus providing a greater organic throughput. In addition, maleic anhydride can be produced in good yields and for prolonged periods of time utilizing the present process. Because of the short contact time required by this catalyst increased capacity of maleic reactors may be attained.

Thus, according to the present invention, a method of producing maleic anhydride is provided which comprises reacting a gaseous mixture of oxygen and benzene at elevated temperature in the presence of a catalyst composition of a mixture of oxides of vanadium, molybdenum, and cobalt and an alumina carrier. In addition to these oxides small quantities of alkali metal halides, preferably chlorides, are also present on the carrier. Still further, a method of preparing the catalyst herein contemplated is included. A very satisfactory method includes forming an aqueous solution of vanadium, molybdenum, and cobalt chlorides (or catalytic materials. Hydrochloric acid has been found extremely suitable for this purpose. It is an effective agent for solubilizing any metal impurities present on the carrier.

In this preferred mode of operation, therefore, carrier particles which are to be utilized in the process and catalyst of this invention, are first immersed in or contacted with an aqueous hydrochloric acid solution, preferably of concentrated strength, for example, 10 to 40 percent by weight HCl for a period of time sufficient to accomplish removal of all, or substantially all, contaminating metals present on the catalyst carrier. As a practical matter leaching times may range between from 5 hours to 72 hours or longer. A 72 hour leaching period forms a preferred time of treatment. The carrier itself employed in accordance with this invention may comprise any particulate alumina base carrier material such as Alundum pellets, bauxite and other alumina silicate or sodium alumino silicate materials. The particle size of the carrier normally ranges from 4 to 8 mesh. The surface area of the catalyst is preferably between 0.5 to 2 square meters per gram though surface areas higher or lower may be employed. If higher surface areas are employed the pore diameter should be smaller than the diameter of the benzene molecule.

The metallic components of the catalyst are complexed by dissolving them in aqueous hydrochloric acid solutions of concentrated strength. Generally, a concentrated aqueous hydrochloric acid solution of 10 to 40 percent by weight HCl is sufficient to accomplish dissolving of the various components. The metallic components may be conveniently added to the hydrochloric oxychloride) in aqueous hydrochloric acid solution together with an alkali metal halide. To this solution alumina carrier particles are added and continuously mixed with the solution. During the mixing operation, heating and evaporating of the water of the solution is carried out. During this continuous mixing and evaporating the particles become sensibly dry, i.e., substantially dry to the touch. Continuous mixing in this manner provides a uniform coating of the particles and contributes to a production of a reproducible catalyst.

In producing the catalytic materials for use in accordance with this invention many factors are taken into consideration. Thus, with respect to the carrier employed it is an important consideration that the particles utilized be uniform, or nearly uniform, in size. In addition, the particles should preferably be substantially uniform with respect to the impurities they contain. Thus, contaminating quantities of water-soluble impurities present on a catalyst particle seriously detract from its use as a carrier for the catalyst employed herein and preferably the carrier should be essentially free from such impurities. In a preferred embodiment of the instant invention, therefore, all carrier particles utilized to contain the active catalyst material herein described are leached with a strong reducing acid solution prior to conducting the coating or impregnation of the carrier with the active acid mixture in the form of their respective oxides with agitation and heating if necessary to accomplish complete dissolution of the oxides in the HCl. On completion of the dissolution of the active oxidic materials utilized in the catalyst composition, the alkali metal halide salt employed in conjunction with the oxides is added and dissolved in the HCl solution. While this order of addition constitutes a preferred mode of operation it is, of course, understood that the alkali metal halide employed may be added to the solution simultaneously with, or prior to, the addition of the active oxides.

The composition of the catalyst itself is important and the relative quantities of the constituents added to the hydrochloric acid solution should be maintained within certain limits. Thus, vanadium is added to the solution preferably in the form $V_2O_5$ in quantities representing between 65 and 68 percent by weight of the total mixture of oxidic components. Molybdenum oxide is added to the HCl preferably as $MoO_3$ and ranges between 25 and 29 percent may be employed. The cobalt, preferably as cobalt oxide, $Co_2O_3$, is added in quantities ranging between 4 and 6 percent. An ideal or preferred mixture of the above components comprises 67.5 percent by weight $V_2O_5$, 27.5 percent by weight $MoO_3$ and 5 percent $Co_2O_3$ by weight. Adherence to the preferred weight mixture is recommended since the catalyst components in these quantities produce most effective prolonged results in conjunction with vapor phase catalytic oxidation of benzene. While weight percentages have been given with respect to certain specific oxides of the metals used in the catalyst, other salts or oxides of these metals may be employed. If other salts or oxides are employed, the mole ratio of metals to one another should be the same as the mole ratios of the metals present in the oxides herein above set forth. In addition to the above components, a quantity of alkali metal halide is added to the mixture in amounts approximating 1.2 percent by weight of the total actives, that is the oxide ingredients above referred to. Quantities considerably above this amount are to be avoided. While quantities below this weight percent produce some beneficial results, quantities approaching or approximating the 1.2 percent value are found most desirable. Generally, an alkali metal halide in amounts ranging between 1 and 3 percent by weight of the actives is satisfactory. The alkali metal halides employed in accordance with this invention are generally in the form of chloride salts. While various alkali metal chlorides may be employed, the invention has been found particularly effective when the alkali metal halide takes the form of sodium chloride or potassium chloride.

The manner of deposition of the active oxides on the carrier is extremely important in achieving most beneficial results from the catalyst composition herein before described. Thus, deposition of the active oxides on the carrier should be as uniform as possible and, at the time, capable of being reproduced with ease. Thus, it has been found that by continuously agitating the concentrated acid solution of active oxides in contact with the carrier particles previously leached with HCl and conducting at the same time the evaporation of the water content of the solution containing the active oxides that a very uniformly coated catalyst is produced. As a preferred mode of conducting this continuous agitation and evaporation of the water content of the catalyst containing solution, automatic tumbling devices are preferably employed.

Heating of the solution contacting the carrier particles during this mixing and evaporation stage may be applied in various forms. One particularly effective method of applying heat to the solutions during the tumbling has been found by utilizing electrical heating mantels in conjunction with solution containing jars which are placed in tumbling devices. While these mechanical mechanisms form a preferred mode of conducting the operation it is, of course, understood that other types of agitation and heating equipment may be employed. The important consideration is that during the coating of the carrier particles, the particles in the catalyst containing solution should be continuously agitated while the water content of the solution is evaporated to insure a uniform coating, while at the same time providing adequate mixing of the oxide components contained in the concentrated solution of complexed oxides.

The catalyst thus obtained is a dry granular coposition of a porous base carrier containing the desired oxides in the following approximate proportions basis the metal content:

|  | Mole |
|---|---|
| Vanadium | 1 |
| Cobalt | .07 to .108 |
| Molybdenum | .230 to .272 |
| Alkali metal | .0014 to .0042 |

Preferably mole concentrations basis the metal content are vanadium 1, cobalt .09, molybdenum .258 and the alkali metal .0017. It is essentially dry to touch. It is essentially free from catalyst poisons which reduce the activity of the catalyst. The catalyst materials placed on the carrier represent a solids loading on the carrier of between 14 and 22 percent by weight, preferably between 15.5 and 17 percent by weight.

After the catalyst has been prepared and the oxides deposited thereon, it is activated by charging it into a reactor substantially dry and operated at a low temperature, that is, a temperature in the range of between 180 and 250° C. Air and benzene at a high weight ratio of air to benzene, that is, 45 to 55 parts by weight of air to one part by weight of benzene are passed through a bed of the catalyst after it is charged into the reactor in order to sweep out the water of hydration and excess HCl. Air and benzene during this moisture removal stage are passed at a slow rate, approximately 0.20 second residence time for the air and benzene in the reactor. In general, temperatures above 500° C. during this drying step are to be avoided since the catalyst can be easily overheated and deactivated or fused as a result of overheating.

Vapor phase catalytic oxidation procedures conducted in accordance with this invention may be conducted in tubular reactors. Generally, any tubular reactors constructed of a material which can resist reaction conditions existing within the catalyst zones contained in the tubular reactor may be employed. Nickel, stainless steel, ceramic lined steels, and other such corrosion resistant structural materials are typical of types of reactors employed. The diameter of the tubular reactors may vary considerably, but generally speaking are in the range of from one quarter inch to eight inches in internal diameter.

Tubular reactors employed herein are controlled by means of suitable jacketing and the circulation or refluxing therein of a suitable heat exchange material. For this purpose various heat transfer materials may be employed such as Dowtherm, molten salt baths and the like.

In conducting the reaction, various contact times may be employed. Contact time as employed herein in the specification and claims refers to that period of time necessary for a given quantity of reactant to pass through the catalyst bed contained within a given reactor length employed. Generally, contact times may range between 0.1 second to 0.7 second, preferably between 0.13 and 0.3 second. The weight ratio of air to benzene utilized in accordance with this invention is considerably variable. Generally, ranges between 30 to 1 to 200 to 1 air to benzene may be employed, preferably 35 to 1 to 50 to 1 ratios being used.

The following examples are given as illustrative of some of the modes of operation which may be employed conducting the invention without limiting it to the precise details set forth.

EXAMPLE I

A 4,000 milliliter Pyrex glass beaker, which had been previously acid leached, was employed in treating the pellets. The pellets were fused cylindrical Alundum pellets ⅛ inch in diameter by ⅛ inch long in dimension. 3,000 milliliters of the Alundum pellets were placed in the 4,000 milliliter beaker. Sufficient concentrated hydrochloric acid (36 percent by weight HCl) was added to the beaker containing the pellets to completely cover them. The beaker was heated for 24 hours at 100° C. and after the 24 hour period the acid was decanted and 2 more acid leaches conducted in the same manner. After the third leaching, the pellets were washed with distilled water to remove any excess HCl present and dried at 100 to 110° C. for about 48 hours. The pellets were then screened through nickel screens with the fraction from 4 to 6 mesh being used for catalyst preparation.

432 grams of vanadium pentoxide, 176 grams of molybdenum trioxide, and 35.4 grams of cobalt oxide together with 7.69 grams of sodium chloride were placed in a 2500 milliliter Vycor beaker 8 inches high and 6 inches in diameter. Concentrated hydrochloric acid (36 percent by weight HCl) was added to this beaker until it was approximately two-thirds full and the contents intermittently stirred with a Vycor rod during the addition of the concentrated acid to the beaker. The mixture was allowed to stand for several hours. After standing for several hours, the mixture was heated on a hotplate until most all of the oxides were dissolved. The solution was then evaporated to about one-half the original volume and additional concentrated hydrochloric acid added to complete the dissolving of the oxides. The solution turned a dark greenish-blue indicating the complete dissolution of the materials. This hydrochloric acid solution was then evaporated by heating on a hotplate at 110° C. to about two-fifths of the original volume.

The hydrochloric acid solution containing the catalyst was then added to a 13 liter Pyrex battery jar which had been previously acid leached with hydrochloric acid. The battery jar in turn was placed in a heating mantel. The battery jar and associated heating mantel were placed on a rotating plate equipped with an electrical outlet. The plate was energized and rotated on its horizontal axis while heating the mixture to 150° C. 3,360 milliliters of screened pellets as prepared above were added to the solution and stirred with a "Teflon" paddle to insure complete mixing. The mixture was agitated constantly by the rotation of the jar, thus tumbling the mixture. The "Teflon" paddle was continuously used during the period when the catalyst went through a tacky stage as it approached dryness. After the catalyst was dry and free flowing due to rotation of the tumbler, the tumbler was adjusted to an angle of 105° to secure uniform air drying and it was dried for a period of 2 to 4 hours at 100° to 220° C. The catalyst was then allowed to cool for 2 to 3 hours. Nickel screens were utilized to remove fines and fused particles. The material was then stored in a glass container for future use.

EXAMPLE II

Catalyst prepared in accordance with Example I was charged to a plurality of tubular reactors having varying internal diameters and constructed of various materials. These reactors were operated at various temperatures to produce maleic anhydride from benzene and oxygen. The results of these runs are listed in Table I.

Table I

The evaluation of each catalyst was done at an approximate weight ratio of 35 to 1 air to benzene and a contact time of 0.20 second. All catalyst beds were 130 centimeters in length. The only known variables were the tube size and materials of construction of tubes utilized. Maleic anhydride was recovered as maleic acid by scrubbing exit gases with water.

EVALUATION

| Run | Tube size (internal diameter), cm. | Reactor (tube material) | Yield (mole percent) (basis benzene consumed) | | Temperature,[1] max. yield, ° C. |
|---|---|---|---|---|---|
| | | | Unreacted benzene | Maleic anhydride | |
| 1 | 2.03 | Stainless steel | 0.0 | 62.1 | 421 |
| 2 | 1.54 | Nickel | .09 | 61.9 | 454 |
| 3 | 2.08 | ---do--- | 3.7 | 58.8 | 423 |
| 4 | 2.14 | Carbon steel | Trace | 62.4 | 402 |
| 5 | 2.03 | Stainless steel | 5.6 | 64.1 | 430 |
| 6 | 1.54 | Nickel | 1.9 | 64.7 | 477 |
| 7 | 2.08 | ---do--- | 2.0 | 65.5 | 402 |
| 8 | 2.14 | Carbon steel | 0.9 | 61.1 | 488 |
| 9 | 2.14 | ---do--- | 0.9 | 63.2 | 435 |
| 10 | 2.08 | Nickel | 0.0 | 65.3 | 427 |
| 11 | 2.14 | Carbon steel | 0.0 | 65.3 | 427 |

[1] Temperatures were varied between 400° C. and 530° C. with the temperature at which maximum yields were obtained being reported.

As can be readily seen from the evaluation of the table listed on page 12, utilization of the above catalyst to produce maleic anhydride by the vapor phase catalytic oxidation of benzene produces maleic anhydride in substantial yields. In addition, it is to be noted that the yields of maleic anhydride are substantially uniform.

EXAMPLE III

A nickel tubular reactor 198.1 centimeters long having an internal diameter of 1.54 centimeters was charged with catalyst prepared as in Example I for a length of 112 centimeters. Several runs were conducted with butane and air being fed to the reactor. The weight ratio of air to butane was maintained at 200 to 1 and the contact time was regulated at 0.8 second. The maleic anhydride produced was recovered as maleic acid by scrubbing exit gases with water. The results of these runs are listed below in Table II.

Table II

| Run | Temperature, ° C. | Yield (mole percent maleic anhydride recovered basis), butane reacted |
|---|---|---|
| 1 | 375 | 15.3 |
| 2 | 425 | 26.5 |
| 3 | 450 | 12.0 |
| 4 | 475 | 16.3 |
| 5 | 500 | 11.5 |

EXAMPLE IV

A nickel tubular reactor 198.1 centimeters long and having an internal diameter of 1.54 centimeters was charged with catalyst prepared as in Example I for a length of 112 centimeters. Several runs were made in this reactor utilizing an air and butene-2 feed. A weight ratio of air to butene of 200 to 1 was employed in all runs and a contact time of 0.8 second was also maintained constant. The maleic anhydride produced was recovered as maleic acid by scrubbing the product gas stream with water. The results of these runs are set forth below in Table III.

Table III

| Run | Temperature, ° C. | Yield (mole percent maleic anhydride recovered basis), butene reacted |
|---|---|---|
| 1 | 425 | 19.8 |
| 2 | 475 | 14.3 |
| 3 | 500 | 7.8 |

While the invention has been described with reference to certain specific embodiments, it is, of course, not intended to be so limited. Many variations may be employed in conducting reactions utilizing the catalyst herein above described. Thus, butane and butene may be utilized in place of benzene to produce maleic anhydride. The invention is therefore not intended to be limited in scope by the specific embodiments herein disclosed, except insofar as appears in the accompanying claims.

We claim:

1. A method of preparing maleic anhydride comprising reacting benzene and oxygen in the presence of a catalyst consisting essentially of an oxide mixture of $V_2O_5$, $MoO_3$, $Co_2O_3$, and an alkali metal chloride of the group consisting of NaCl and KCl impregnated on an inert carrier, the mole ratio of vanadium to molybdenum to cobalt to the alkali metal being 1 to .258 to .090 to .0017.

2. A method of producing maleic anhydride comprising catalytically reacting butane and oxygen in the vapor phase in the presence of a catalyst consisting essentially of a mixture of $V_2O_5$, $MoO_3$, $Co_2O_3$ and an alkali metal chloride of the group consisting of NaCl and KCl impregnated on an inert carrier, said mixture having 65 to 68 percent $V_2O_5$ by weight, 25 to 29 percent $MoO_3$ by weight, 4 to 6 percent $Co_2O_3$ by weight and 1 to 3 percent alkali metal chloride by weight.

3. A method of producing maleic anhydride comprising catalytically reacting butene and oxygen in the vapor phase in the presence of a catalyst consisting essentially of a mixture of $V_2O_5$, $MoO_3$, $Co_2O_3$, and an alkali metal chloride selected from the group consisting of sodium chloride and potassium chloride impregnated on an inert carrier, said mixture having 65 to 68 percent $V_2O_5$ by weight, 25 to 29 percent $MoO_3$ by weight, 4 to 6 percent $Co_2O_3$ by weight, and 1 to 3 percent alkali metal chloride by weight.

4. A method of producing maleic anhydride comprising catalytically reacting benzene and oxygen in the vapor phase in the presence of a catalyst consisting essentially of a mixture of $V_2O_5$, $MoO_3$, $Co_2O_3$, and an alkali metal chloride of the group consisting of sodium chloride and potassium chloride impregnated on an inert carrier, said mixture having 65 to 68 percent $V_2O_5$ by weight, 25 to 29 percent $MoO_3$ by weight, 4 to 6 percent $Co_2O_3$ by weight, and 1 to 3 percent alkali metal chloride by weight.

5. A method of producing maleic anhydride comprising catalytically reacting benzene and oxygen in the vapor phase in the presence of a catalyst consisting essentially of $V_2O_5$, $MoO_3$, $Co_2O_3$, and sodium chloride impregnated on an inert carrier, said mixture having 67.5 percent by weight $V_2O_5$, 27.5 percent $MoO_3$ by weight, 5 percent $Co_2O_3$ by weight, and 1.2 percent NaCl by weight.

References Cited in the file of this patent

UNITED STATES PATENTS

| | | |
|---|---|---|
| 2,625,519 | Hartig et al. | Jan. 13, 1953 |
| 2,719,853 | Reid et al. | Oct. 4, 1955 |
| 2,734,874 | Drake et al. | Feb. 14, 1956 |
| 2,739,132 | Riedl | Mar. 20, 1956 |
| 2,777,860 | Egbert et al. | Jan. 15, 1957 |

FOREIGN PATENTS

| | | |
|---|---|---|
| 659,786 | Great Britain | Oct. 24, 1951 |

OTHER REFERENCES

Kipianov et al.: Chemical Abstracts, volume 36 (1942), column 2569.

Ephraim: Inorganic Chemistry, Sixth English Edition, 1954, page 262.

Bhattacharyya et al.: J. Applied Chem., volume 8 (1958), pages 730 and 733–4.

UNITED STATES PATENT OFFICE
CERTIFICATE OF CORRECTION

Patent No. 3,074,969　　　　　　　　　　　　January 22, 1963

Ralph O. Kerr et al.

It is hereby certified that error appears in the above numbered patent requiring correction and that the said Letters Patent should read as corrected below.

Column 1, line 62, beginning with "(or catalytic materials" strike out all to and including "present on the carrier." in line 65, same column 1, and insert instead (or oxychloride) in aqueous hydrochloric acid solution together with an alkali metal halide. To this solution alumina carrier particles are added and continuously mixed with the solution. During the mixing operation, heating and evaporating of the water of the solution is carried out. During this continuous mixing and evaporating the particles become sensibly dry, i.e., substantially dry to the touch. Continuous mixing in this manner provides a uniform coating of the particles and contributes to the production of a reproducible catalyst.

In producing the catalytic materials for use in accordance with this invention many factors are taken into consideration. Thus, with respect to the carrier employed it is an important consideration that the particles utilized be uniform, or nearly uniform, in size. In addition, the particles should preferably be substantially uniform with respect to the impurities they contain. Thus, contaminating quantities of water-soluble impurities present on a catalyst particle seriously detract from its use as a carrier for the catalyst employed herein and preferably the carrier should be essentially free from such impurities. In a preferred embodiment of the instant invention, therefore, all carrier particles utilized to contain the active catalyst material herein described are leached with a strong reducing acid solution prior to conducting the coating or impregnation of the carrier with the active catalytic materials. Hydrochloric acid has been found extremely suitable for this purpose. It is an effective agent for solubilizing any metal impurities present on the carrier.

Column 2, line 22, beginning with "oxychloride)" strike out all to and including "with the active" in line 48, same column 2.

Signed and sealed this 29th day of September 1964.

(SEAL)
Attest:

ERNEST W. SWIDER
Attesting Officer

EDWARD J. BRENNER
Commissioner of Patents